May 11, 1965 S. N. ZILBERFARB ETAL 3,182,675
PURE FLUID VELOCITY MODULATED AMPLIFIER
Filed Nov. 17, 1961 3 Sheets-Sheet 1

SEC. A-A'

INVENTORS
SAUL N. ZILBERFARB
EUGENE M. POLTER

BY Griffin and Stokes
ATTORNEYS

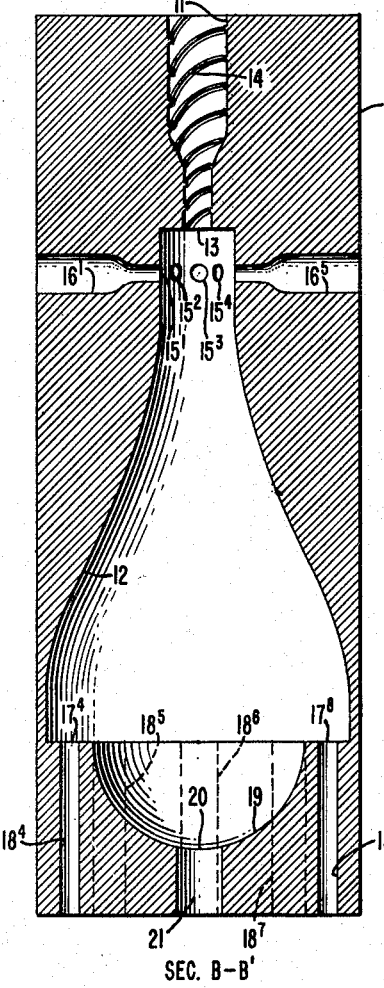
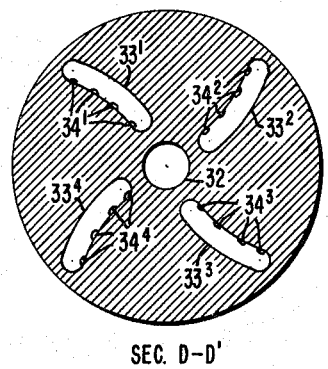
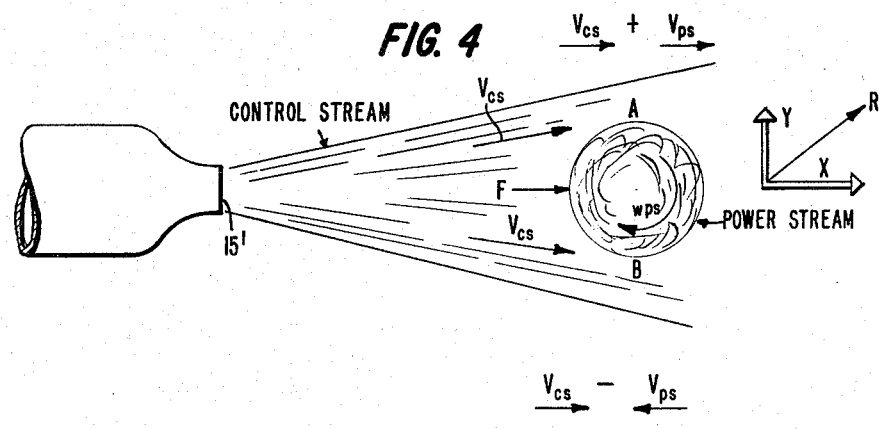

May 11, 1965 S. N. ZILBERFARB ETAL 3,182,675
PURE FLUID VELOCITY MODULATED AMPLIFIER
Filed Nov. 17, 1961 3 Sheets-Sheet 3

SEC. D-D'

SEC. C-C'

United States Patent Office 3,182,675
Patented May 11, 1965

3,182,675
PURE FLUID VELOCITY MODULATED
AMPLIFIER
Saul N. Zilberfarb and Eugene M. Polter, both of Philadelphia, Pa., assignors to Sperry Rand Corporation, New York, N.Y., a corporation of Delaware
Filed Nov. 17, 1961, Ser. No. 153,164
16 Claims. (Cl. 137—81.5)

This invention relates to pure fluid devices, and more particularly, to one wherein an impinging control stream shifts the power stream in a direction other than the direction of said control stream.

The currently important art of fluid amplifiers, devices, and the like, has primarily developed single plane devices, wherein the power stream is shifted in the same direction as the impinging control stream. That is, the force of a control stream which strikes a power stream at substantially right angles thereto shifts the power stream through an angle within the same plane as that defined by the longitudinal axis of the control stream flow and the undiverted trajectory of the power stream. However, the present invention differs from fluid devices of the prior art in that it permits the power stream to shift in a direction so that it no longer lies in said same plane. This function is performed by causing the power stream to have a rotary motion about its longitudinal flow axis by means of a helical guide within the power stream nozzle. The control stream now impinges upon this power stream and interacts therewith to create a differential velocity at two directly opposite sectors of the power stream. This differential velocity is created because of the addition of the control stream and rotary power stream velocities on one sector, and the subtraction of one from the other on the opposite sector. This differential velocity causes a corresponding decrease and increase of pressure at the respective sectors, the net effect of which is to shift the power stream in a direction at right angles to the direction of the control stream. Additionally, the force of the control stream also shifts the power stream in a direction parallel to the former, as in prior art devices. The resultant direction taken by the power stream therefore lies in a plane which does not include either the control stream trajectory or the original trajectory of the power stream as it emerges from the nozzle prior to its intersection with the control stream. The actual angle of power stream shift from its original trajectory varies proportionally to the absolute velocity of the control stream, assuming that the rotary velocity of the power stream particles remains constant.

Therefore, an object of the present invention is to provide a pure fluid device including a power stream and at least one control stream wherein the rotary motion of power stream particles about its longitudinal flow axis enables said power stream to be shifted in a direction other than the direction of the control stream.

In line with the object and principles of the present invention, several specific embodiments thereof may be devised. One embodiment comprises a three dimensional, pure fluid amplifier wherein the power jet stream is deflected from one output passageway into another upon collision with a control stream. In this embodiment, a plurality of control stream orifices may be spaced about the power stream flow axis, with each orifice adapted to emit a control stream for deflecting the power stream from a common output port into an output port individual to the particular generated control stream. Furthermore, if the power stream fails or is below design value, then the rotary velocity of its particles about its flow axis will prevent the power stream from being deflected to the proper receiving port. Instead, it will flow into the common port so that the amplifier either yields a proper output or none at all.

It is therefore another object of the present invention to provide a three dimensional pure fluid amplifier utilizing a power stream with rotary motion about its flow axis, together with one or more control streams for deflecting said power stream to one of a plurality of receiving ports.

Yet another object of the present invention is to provide a three dimensional, pure fluid amplifier which is prevented from yielding an improper output.

A second specific embodiment of the present invention is one wherein a control stream can shift the power stream into one of a group of receiving ports according to the velocity of the former. The ports of the group are formed in a row radially extending from the normal undiverted trajectory of the power stream.

Therefore, it is a further object of the present invention to provide a multi-output pure fluid amplifier capable of diverting the power stream into one of said ports according to the velocity of the control stream.

A third specific embodiment of the present invention is designed to function primarily as a velocity meter. Since the angle of power stream shift varies proportionally to the absolute velocity of the control stream, an elongated receiving port is provided into which the power stream may be deflected at different longitudinal locations thereof by a control stream whose velocity is to be measured. Disposed within this elongated port or slot are numerous flow position sensors which directly indicate the position of the deflected power stream, with said position of the power stream within the port being proportional to the velocity of the control stream. Furthermore, such an arrangement can also be operated as an amplifier employing velocity modulation.

It is therefore an object of the present invention to provide a pure fluid velocity meter for measuring the velocity of a control stream applied thereto.

An additional object of the present invention is to provide an amplifier employing velocity modulation.

These and other objects of the present invention will become apparent during the course of the following description wherein several specific and preferred embodiments of the invention are described, and with which the following drawings are to be utilized.

FIGURE 3 is a sectional view in plan of the embodiment of FIGURE 1;

FIGURE 4 is the diagrammatic view illustrating the principle of operation of the present invention;

FIGURE 8 is an alternative arrangement of the receiving ports of the embodiment of FIGURE 5.

Figure 1:
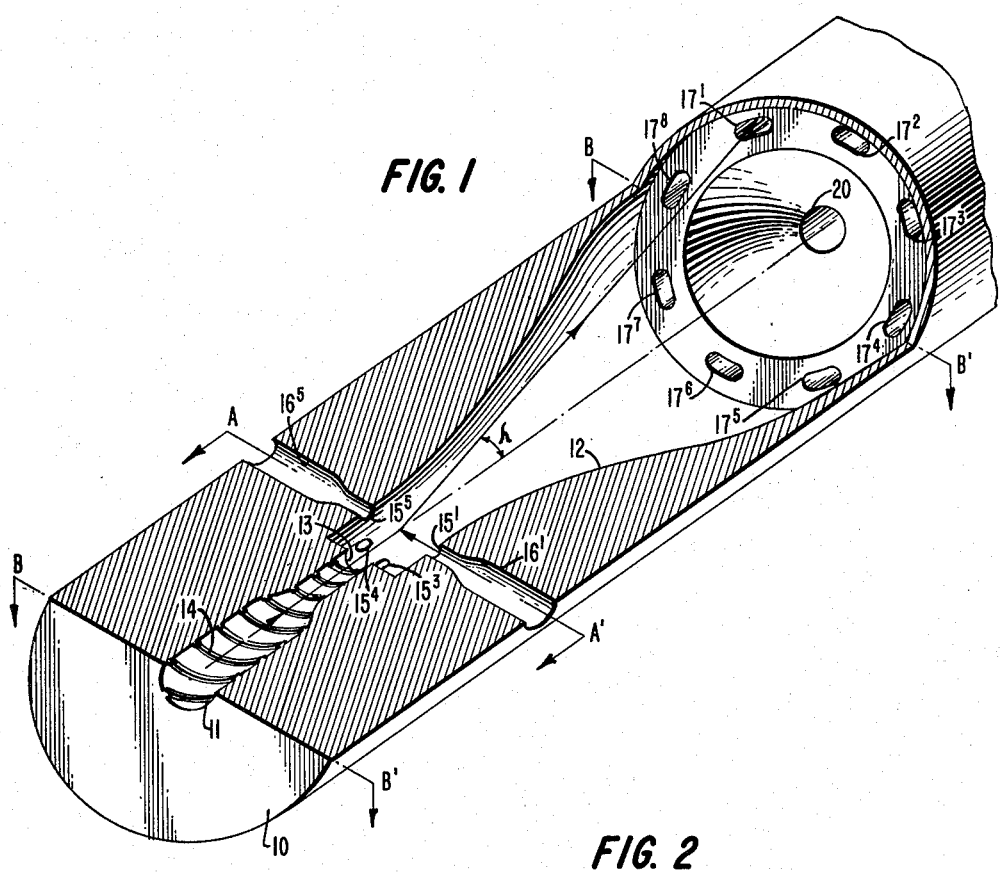
FIGURE 1 shows a perspective view in section of a three dimensional pure fluid amplifier employing the principles of the present invention.

Referring first to FIGURE 1, there is shown a three dimensional pure fluid amplifier having means for producing a fluid power jet stream with rotary motion about its longitudinal flow axis, together with a plurality of means each selectively producing a control jet which impinges on said power stream and deflects same to an individual one of a plurality of receiving ports. This amplifier comprises a solid body 10 having a plurality of fluid passageways in which the working fluid may flow.

The working fluid may be either air or another gas, or water or another liquid. Although a sectional view of the amplifier is shown in FIGURE 1, it is to be understood that the passageway might comprise a series of tubes interconnected and then encased or potted in suitable material which acts as a supporting means. Other methods of fabrication may also be employed in order to arrive at the configuration shown in FIGURE 1.

A compressor or pump, not shown in any of the figures of the drawings, supplies a suitable regulated stream of fluid to the input of the power passageway 11. Passageway 11 may have its circumference reduced in size so as to form a nozzle which exists into a chamber 12 via orifice 13. Within power channel 11 is a helical guide 14 which may be formed by a spiral protruding ridge along the wall similar to the rifling found in the bore of a gun. This helical guide within power passageway 11 produces a rotary motion of the power stream fluid particles about its longitudinal axis of flow as the power stream emerges from orifice 13 into chamber 12. Thus, the power stream particles have motion both in a longitudinal direction toward the other end of chamber 12 as well as in a rotary direction around the flow axis.

Figure 2:
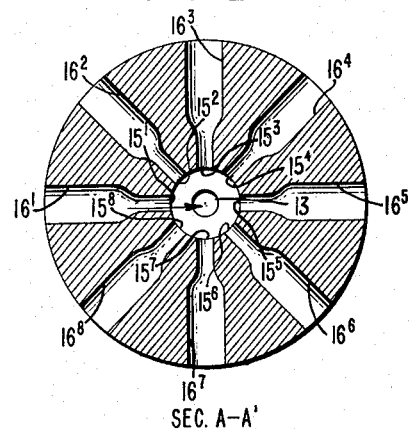
FIGURE 2 is a cross-sectional view of the control stream channels of the embodiment in FIGURE 1.

Chamber 12 is formed by the divergence of its walls from the end wall in which orifice 13 is located. Said walls of chamber 12 are so constructed as to cause no power stream fluid adherence. Situated in the side walls of chamber 12, and circumferentially disposed about the emerging power stream, are a plurality of control stream orifices $15^1$ through $15^8$, all of which are shown in FIGURE 2 which is a cross-sectional view of the fluid amplifier taken through the plane in which the orifices are located. These orifices are the outputs of a plurality of control stream passageways $16^1$ through $16^8$ which are radially disposed about the chamber 12 as shown in FIGURE 1 and FIGURE 2. Means are provided, not shown in any of the figures, for selectively supplying a stream of fluid to any one of the control stream passageways although normally only one control stream is produced at any one time depending upon the output port to which the power stream is to be directed. The control passageways 16 and orifices 15 are smaller in diameter than that of the power stream, so that the control stream is of considerably lower power than the power stream. For this reason, the device is considered to amplify the power of a control stream (defined to be the input thereto) because of the larger power of the power stream (defined to be the output of the device). The direction or trajectory of a control stream after emerging from its respective orifice 15 into chamber 12 is such as to impinge at approximately a right angle with the power stream emerging from orifice 13.

Situated at the opposite end of chamber 12 from that containing orifice 13 is a plurality of power stream receiving ports $17^1$ through $17^8$ which in turn are inputs to a plurality of output passageways $18^1$ through $18^8$, shown in FIGURE 3. These ports 17 may take any shape although in FIGURE 1 they are somewhat elongated. Ports 17 are circumferentially disposed about the center axis of chamber 12, which is that axis along which the power stream flows after emerging from orifice 13 but prior to its intersection with one of the control streams. This axis is also the one traced by the power stream if it remains undiverted. In the center of this end wall is a slope drain 19 which connects with a center waste port 20 acting as the input to output passageway 21.

In general, the impingement of a control stream upon the power stream causes said power stream to deflect to a corresponding output port 17 from whence it is conducted via its associated passageway 18. For example, FIGURE 1 shows the power jet stream flowing through chamber 11 in the direction of the arrow and emerging into chamber 12 in a direction along its longitudinal axis. Fluid is now applied to chamber $16^1$ so that a control stream emerges from orifice $15^1$ which impinges upon the power stream at the point indicated and shifts the latter through an angle (measured between the chamber 12 longitudinal axes and the new trajectory of the power stream) so that it enters receiving port $17^1$. The phenomenon causing this shift is diagrammatically illustrated in FIGURE 4 which is essentially a view taken at right angles to the power stream as it emerges from orifice 13. Thus, when looking from chamber 12 into orifice 13, the control orifice $15^1$ under investigation is to the left. The control stream emerging therefrom has a horizontal direction toward the right, and the power stream is here considered to have a velocity directed out from the plane of the paper.

In FIGURE 4, the indicated terms are defined as the following:

$w_{ps}$ equals the angular velocity of the power stream due to action of the helical guide;

$V_{ps}$ equals the linear velocity of the power stream rotating particles at the point of impingement with control stream; and $V_{cs}$ equals the linear velocity of the control stream at point of impingement.

Since the direction of the rotating power stream particles around the vicinity of sector A in FIGURE 4 is in the same direction taken by the control stream particles, the net velocity of the fluid particles in this vicinity is the summation of $V_{cs}+V_{ps}$. Conversely, the direction of motion of the rotating power stream particles around the vicinity of sector B in FIGURE 4 is opposite to the direction of motion of the control stream particles in this vicinity. Therefore, the net velocity of the fluid particles in the vicinity of sector B is the difference between the control stream velocity $V_{cs}$ and the linear velocity $V_{ps}$ of the rotating power stream particles. Thus, a differential velocity exists with respect to the two diametrically opposed sectors A and B. According to Bernoulli's Principle, fluid pressure is inversely proportional to fluid velocity. Therefore, the increase in fluid velocity at A causes a corresponding decrease of pressure in this vicinity, while the decrease of velocity at B causes a corresponding increase of pressure in this vicinity. The net effect of the differential pressure is to shift the power stream in a direction shown by vector Y, which thereupon takes the power stream out of the plane in which it was initially flowing as defined by its undeflected trajectory and the control stream longitudinal flow axis.

The control stream from orifice $15^1$ also has kinetic energy by virtue of its velocity. This kinetic energy applies a horizontal force F against the power stream at the point of impingement, said force being in the same direction as that taken by the control stream. Thus, the power stream also experiences a shift in the direction indicated by the vector X. The actual motion or shift experienced by the power stream is therefore the resultant of the two component motions Y and X and is indicated in FIGURE 4 by the vector R. Consequently, the power stream is shifted through an angle $\lambda$ in a plane which passes through the longitudinal axis of chamber 12, but which is diagonal to the horizontal plane in which the control stream and the undeflected power stream lie. This is in contrast with the prior art fluid amplifiers wherein the emerging power stream does not have a rotary motion about its flow axis. These prior art devices permit a shift of the power stream only in direction X, but not in the direction Y. Therefore, it is accurate to call such prior art fluid amplifiers single plane devices, inasmuch as the shift of the power stream takes place in the same plane as that in which the control stream and undeflected power stream lie. In the present invention, however, the shift of the power stream occurs in a plane (or direction) other than that of the control stream.

In FIGURE 1, the angle $\lambda$ of power stream shift within the plane varies proportionally to the absolute velocity of the control stream. In practice, the trajectory of the shifted power stream may actually define an arc of large radius before reaching the output port instead of the straight line as shown in FIGURE 1. Thus, it is seen that the flow axis of each output port associated or identified with a particular control stream input channel lies in a plane different from the plane defined by its said associated control stream flow axis and the undeflected power stream. This orientation of an output port flow axis in the present invention should be contrasted with the prior art single plane fluid amplifier device whose power stream output channel has a flow axis lying in the same plane as that defined by the deflecting control stream and the undeflected power stream. The power stream will describe this trajectory as long as the control stream from orifice $15^1$ is maintained, until termination of the latter allows the power stream to revert to an undeflected course along the axis of chamber 12 to the receiving waste port 20. If now a control stream is generated from another one of the eight orifices in chamber 12, for example, from orifice $15^5$, the power stream is again deflected through some angle λ to port $17^5$ which is that associated with orifice $15^5$. Thus, by selectively and sequentially providing fluid to each of the control chambers, the end of the power stream can be made to describe a rotary motion about the circle in which the receiving ports 17 are located. Normally, only one control stream is on at any time, so that the power stream is deflected to one particular port in the end wall of chamber 12.

The arrangement of ports 17 and the inclusion of a sloped drain 19 with waste port 20 also provides a way to insure that if the power stream fails or is below design value, it will not deflect sufficiently to the receiving ports but will flow instead into the waste port 20. The velocity $V_{ps}$ of the power stream is normally always greater than $V_{cs}$ of the control stream. If this is true, then the total deflection of a power stream in the Y direction depends only upon the linear velocity $V_{cs}$. However, assuming that $V_{cs}$ is within its design value, a decrease in the velocity $V_{ps}$ of the power stream below that of $V_{cs}$ results in a lower differential pressure between sections A and B than that which occurs when the velocity $V_{ps}$ is greater than $V_{cs}$. Therefore, the shift of the power stream in direction Y will be less than that required for the stream to reach ports 17, although the shift of the stream in direction X is approximately the same since the assumption has been made that the control stream velocity is of design value. In such a case, the power stream in FIGURE 1 will instead strike the sloped drain 19 and in so doing will flow into paste port 20. Therefore, upon failure of the power stream to attain its design rotational velocity $V_{ps}$, the action of the pure fluid device of FIGURE 1 is to yield either a proper output or none at all. The same holds true for any of the other control streams which may be applied as an input. The elongation of ports 17, although not necessary, may be provided in order to allow a certain latitude in variation of the control and power stream velocities so that these velocities must fall below a certain minimum before the power stream impinges upon the sloped drain. The exact size and shape of the receiving ports 17 will therefore depend upon the environment of the fluid amplifier.

Figure 5:
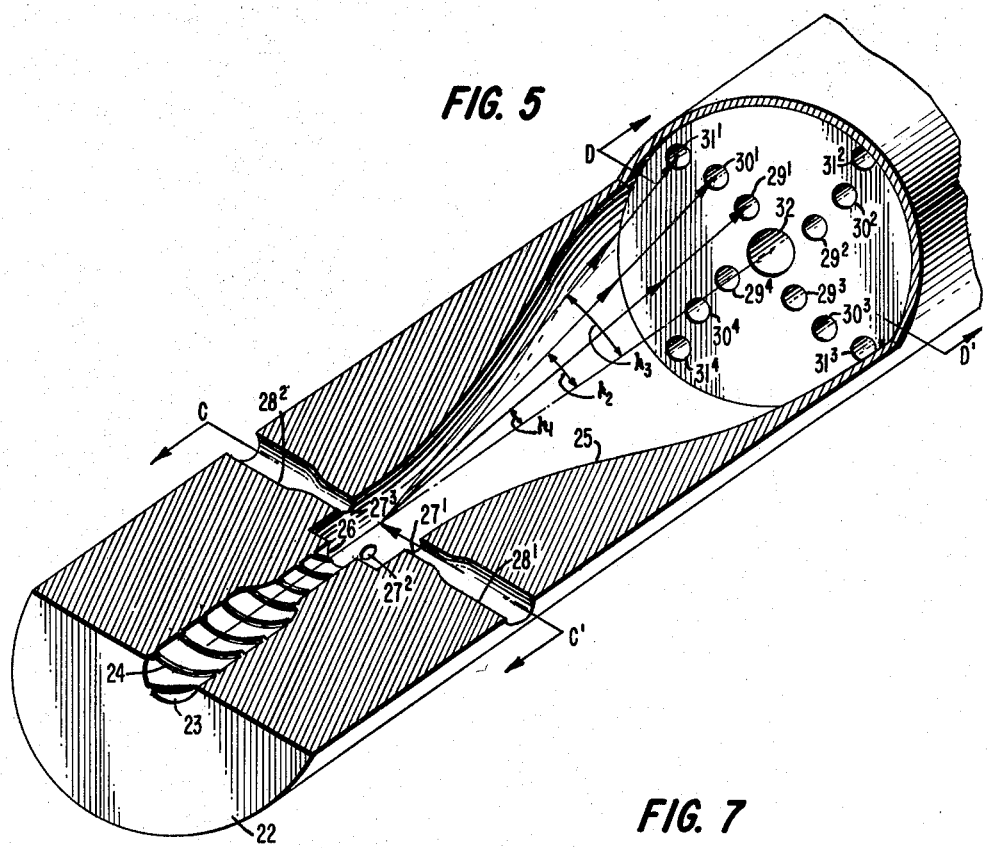
FIGURE 5 is a perspective view in section of another embodiment of the invention.
Figure 6:
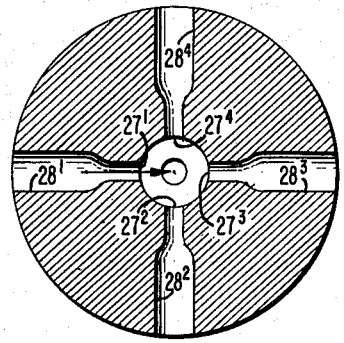
FIGURE 6 is a cross-sectional view of the control channel portion of the embodiment in FIGURE 5.

FIGURE 5 shows another embodiment employing the principles of the present invention which may be utilized either as an amplifier employing velocity modulation, or as a velocity meter to measure the input velocity of a control stream. This embodiment is similar to that shown in FIGURE 1 in that it comprises a solid body 22 having a power channel 23 with a helical guide 24 positioned therein. In addition, power passageway 23 exits into a chamber 25 through an orifice 26. One or more control orifices 27 are circumferentially spaced about the sidewall of chamber 25 near the end wall in order to direct a control stream to impinge upon the power stream as it exits from orifice 26. A plurality of respective control passageways 28 are also associated one with each control orifice, there being four such orifices and passageways which are more clearly shown in the cross-sectional view of FIGURE 6.

Figure 7:
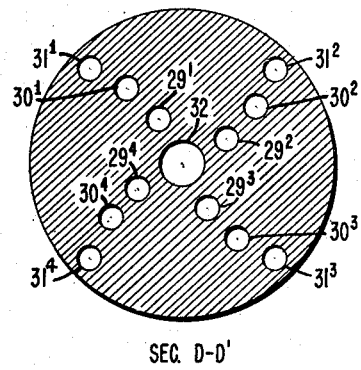
FIGURE 7 is a cross-sectional view showing the location of the receiving ports in the embodiment of FIG. 5.

Positioned in the end wall of chamber 25 opposite that containing orifice 26 are four groups of power stream receiving ports which are spaced regularly about a center waste port 32. Each group is comprised of three ports 29, 30, and 31 which may be arranged in a row radially extending from the center port 32. Each group of ports is associated with a different one of the control orifices 27, as indicated by corresponding superscripts. Thus, ports $29^1$, $30^1$, and $31^1$ are those into which the power stream can be selectively deflected by a variable velocity control stream emerging from orifice $27^1$. In similar fashion, a control stream emerging from orifice $27^3$ may selectively deflect the power stream into any one of the ports $29^3$, $30^3$, or $31^3$ according to the velocity of the former. As shown in FIGURE 7, each port in a group lies in a plane other than the plane of its associated control stream.

The theory of operation of FIGURE 5 may be described in connection with FIGURE 4. Assuming that the rotational velocity $V_{ps}$ of the power stream remains relatively constant, the total angle of displacement of the power stream depends upon the velocity of the control stream $V_{cs}$. Both of X and Y displacements of the power stream increase as $V_{cs}$ increases, under the further assumption $V_{cs}$ at all times is less than $V_{ps}$. Therefore, the angle λ formed between the normal and the shifted trajectories of the power stream will vary according to the velocity of the control stream. In FIGURE 5, this variation in the angle λ is illustrated by indicating that the power stream can be shifted to any one of the three ports $29^1$, $30^1$, and $31^1$ according to the velocity of a control stream from orifice $27^1$. As an example, for one particularly discrete value of control stream velocity, the power stream can be shifted from its original and normal trajectory by an angle $\lambda_1$ to enter port $29^1$, from whence it is conducted via an output passageway (not shown). For another discrete velocity of the control stream, which is higher in value than that considered above, the power stream can be shifted through an angle $\lambda_2$ into receiving port $30^1$. For still a higher discrete value of $V_{cs}$, the power stream may be shifted through angle $\lambda_3$ into receiving port $31^1$. Thus, by varying the velocity of but a single control stream within the fluid amplifier, the power stream may be deflected to one of a plurality of output passageways. Such a feature thereby results in a saving of the number of control inputs required over the fluid amplifiers of the prior art, where a separate control stream is required for each output port into which the power stream is to be diverted.

The fluid receiving ports in each group may be arranged in a slight arc extending outwardly from the center port 32 such as is shown in FIGURES 5 and 7. This arcuate configuration may be provided in the event that the deflection of the power stream in the Y direction is not linearly proportional to the control stream velocity throughout its design range. This may be the case if the increase in the control stream velocity is such as to shift the power stream (at right angles thereto) to such an extent that the former does not maintain the same control over the power stream as it does at a lesser velocity. However, it should be apparent to one skilled in the art that depending upon the environment in which the fluid device finds use, and taking into account the diameters and velocity ranges of the power and control streams, the ports in each group should be arranged at whatever positions are required in order to intercept the end of the power stream as it is shifted through a particular angle λ. Therefore, this invention is not to be limited to a configuration of ports exactly as shown in FIGURE 5.

In the event that no control streams are generated within the device of FIGURE 5, a power stream emerging from orifice 26 maintains its original direction along the longitudinal axis of chamber 25 so as to enter the central waste port 32. As with the ports shown in FIGURE 1, each of the receiving ports of FIGURE 5 may be cast into a shape other than circular so as to allow for certain variation in the control stream velocity for each angle through which the power stream is to be shifted. Furthermore, the total number of control streams provided within the device may obviously be changed, with a corresponding change in the number of groups of fluid receiving ports. The number of ports within each group is obviously also optional depending upon the degree of control that each control stream can exercise upon the power stream. The principle of the present invention as exemplified in the embodiment of FIGURE 5 thereby provides an extremely versatile pure fluid device without any substantial increase in size over the pure fluid devices of the prior art.

The embodiment of FIGURE 5 may be utilized in three distinct modes of operation. One operation is that of an amplifier employing velocity modulation, whereby a change in velocity of the generated control stream causes a shift of the power stream from one output passageway to another which can be interpreted in fluid systems as a modulation of the power stream itself. Another way in which the device of FIGURE 5 can be utilized is in the manner of a velocity meter whereby it is desired to measure the velocity of a fluid stream. In this case, the fluid stream to be sampled is introduced to the device by way of one of the control channels whereupon it shifts the power stream through an angle depending upon its velocity. Thus, each of the fluid receiving ports of the group may have a significance in terms of the fluid stream velocities. In addition to these modes of operation, the device may also be used as a pure fluid amplifier in a digital data processing system in the manner heretofore described wherein the different possible velocities of the control stream act as gating functions for directing the power stream to one of a plurailty of output passageways.

FIGURE 8 of the drawings shows a somewhat modified arrangement of the fluid receiving output ports as compared to those shown in FIGURE 5. Each port is in the shape of an arcuate slot extending radially from the center waste port 32. Each arcuate slot could be considered as being formed by elongating each of the ports in a group of FIGURE 5 until the ports join. Within each curved or arcuate slot of FIGURE 8 are numerous flow position sensors 34 which are disposed along the arc. Each of these sensors 34 is responsive to the pressure of a power stream passing thereover to generate some form of output signal indicating this fact. Each sensor 34 within a slot may be spaced apart one from the other at a distance so that only one, or at most two, of the sensors can be struck by the diverted power stream as it enters the port. In this way, a sensor 34 may directly indicate the position of the deflected power stream. The main advantage of the elongated slot of FIGURE 8, as opposed to the multi-receiving port arrangement of FIGURE 5, is simplicity of construction. However, a secondary advantage may be that of providing greater sensitivity in the event that the device is used as a velocity meter or as an amplifier employing velocity modulation. This is so, since the number of sensors 34 can be so spaced that unique combinations of same are responsive to different positions of the power stream. Consequently, there can be detection of gradual variations in the position of said power stream within the single port.

Although certain preferred embodiments employing the principle of the present invention have been shown and described, it is apparent that modifications may be made thereto by one skilled in the art without departing from the spirit of the invention as defined in the appended claims.

We claim:

1. In a pure fluid device, the combination comprising: first means for producing a power fluid jet stream rotating about its longitudinal flow axis, at least one second means for producing a control fluid jet stream directed to impinge upon said power stream such that the moving control fluid coacts with the rotating power fluid to create a pressure differential in a direction substantially transverse to a first plane defined by the undiverted trajectory of said power stream and the longitudinal flow axis of said control stream, to thereby divert said power stream out of said first plane, and at least one receiving port whose flow axis is located in a plane different from said first plane for receiving said diverted power stream.

2. A device according to claim 1 wherein said first means is a nozzle containing a helical guide which is adapted to receive a fluid stream and direct same to the vicinity of said control stream.

3. A device according to claim 1 wherein the shape of said port is elongated in a direction substantially radial to the undiverted trajectory of said power stream, such that said power stream is diverted into said receiving port for any control stream velocity within a certain range of values.

4. A device according to claim 3 wherein said port elongation is arcuate.

5. A device according to claim 3 wherein said port is elongated for a distance substantially greater than said power stream diameter, and a plurality of fluid flow sensors are spaced apart along its elongation for indicating the position of said power stream as it enters said port.

6. A device according to claim 1 wherein is provided a plurality of power stream receiving ports, each having a flow axis located in a plane different from said first plane, and which are arranged in a row extending in a direction substantially radial to the undiverted trajectory of said power stream, such that said power stream can be selectively diverted into any one of them according to the velocity of said control stream.

7. A device according to claim 6 wherein said ports are arranged in arcuate fashion.

8. In a pure fluid device the combination comprising: first means for producing a power fluid jet stream rotating about its longitudinal flow axis, a plurality of second means each capable of selectively producing a fluid control stream in a direction to impinge upon said power stream such that the moving control fluid coacts with the rotating power fluid to create a pressure differential in a direction substantially transverse to a first plane defined by the undiverted trajectory of said power stream and the longitudinal flow axis of said control stream, to thereby divert said power stream out of said first plane, and at least one receiving port associated with and individual to each of said second means, whose flow axis is located in a plane different from the said first plane partially defined by the control stream of its said associated second means for receiving said diverted power stream.

9. A device according to claim 8 wherein said first means is a nozzle containing a helical guide which is adapted to receive a fluid stream and direct same to the vicinity of said selected control stream.

10. A device according to claim 8 wherein each of said second means and each of said receiving ports individual thereto are circumferentially arranged about the undiverted trajectory of said power stream.

11. A device according to claim 8 wherein a waste port is disposed downstream of said power stream which receives said power stream in the event that said power stream is not diverted to any one of said fluid receiving ports.

12. A device according to claim 8 wherein the shape of each said receiving port is elongated in a direction substantially radial to the normal trajectory of said power stream, such that said power stream is diverted into said receiving port for any associated control stream velocity within a certain range of values.

13. A device according to claim 8 wherein each said receiving port is elongated for a distance substantially greater than said power stream diameter, and a plurality of fluid flow sensors are spaced apart along its elongation for indicating the position of said power stream as it enters said port.

14. A device according to claim 8 wherein is provided groups of fluid receiving ports, each group associated with and individual to a different one of said second means and with each port of a group having its flow axis located in a plane different from the first said plane partially defined by the control stream of its said associated second means, and with the ports of each said group being arranged in a row extending in a direction substantially radial to the undiverted trajectory of said power stream such that said power stream can be selectively diverted into any one of them according to the velocity of said associated control stream.

15. In a pure fluid device, the combination comprising: first means for producing a power fluid jet stream rotating about its longitudinal flow axis; a plurality of second means each capable of selectively producing a fluid control stream in a direction to impinge upon said power stream such that the moving control fluid of the selectively produced control stream coacts with the rotating power fluid to create a pressure differential in a direction substantially transverse to a first plane defined by the undiverted trajectory of said power stream and the longitudinal flow axis of said selectively produced control stream, to thereby divert said power stream out of said first plane; and at least one receiving port whose flow axis is located in a plane different from at least one of said first planes for receiving said diverted power stream.

16. A device according to claim 15 wherein said first means is a nozzle containing a helical guide which is adapted to receive a fluid stream and direct same to the vicinity of said selected control stream.

No references cited.

LAVERNE D. GEIGER, *Primary Examiner.*

M. CARY NELSON, *Examiner.*

UNITED STATES PATENT OFFICE
CERTIFICATE OF CORRECTION

Patent No. 3,182,675

May 11, 1965

Saul N. Zilberfarb et al.

It is hereby certified that error appears in the above numbered patent requiring correction and that the said Letters Patent should read as corrected below.

Column 3, line 13, for "which exists" read -- which exits --.

Signed and sealed this 19th day of April 1966.

(SEAL)
Attest:

ERNEST W. SWIDER
Attesting Officer

EDWARD J. BRENNEI
Commissioner of Patents